July 3, 1951  E. H. FORD  2,559,418
KNEADING APPARATUS
Filed Jan. 30, 1948  4 Sheets-Sheet 2

INVENTOR.
E. HARRY FORD
BY
ATTORNEY

July 3, 1951  E. H. FORD  2,559,418
KNEADING APPARATUS
Filed Jan. 30, 1948  4 Sheets-Sheet 3

INVENTOR.
E. HARRY FORD
BY
AT TORNEY

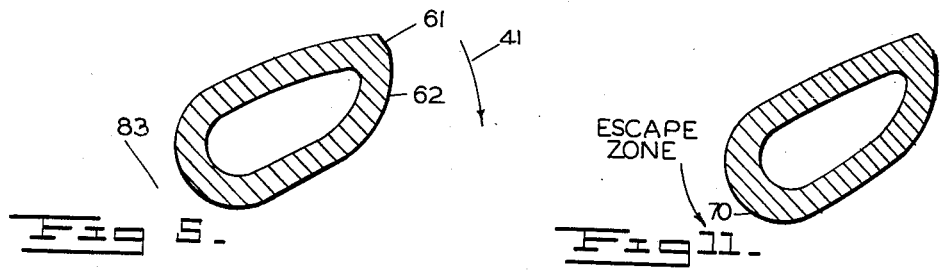
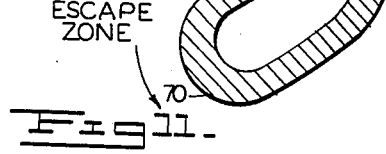
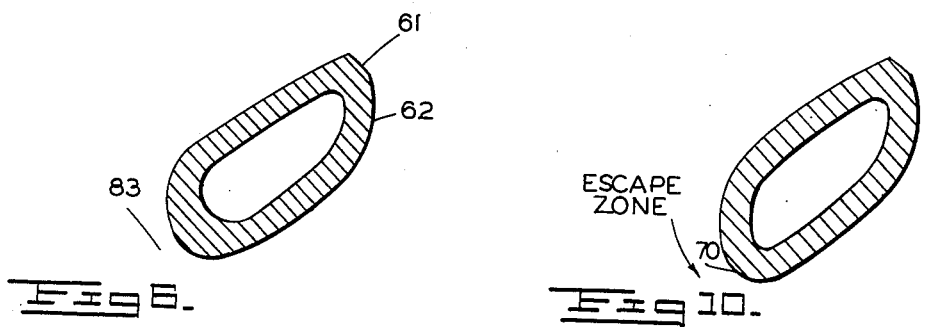
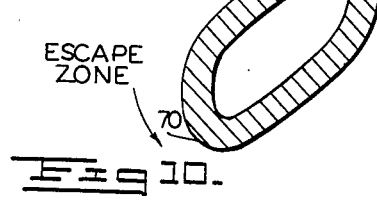
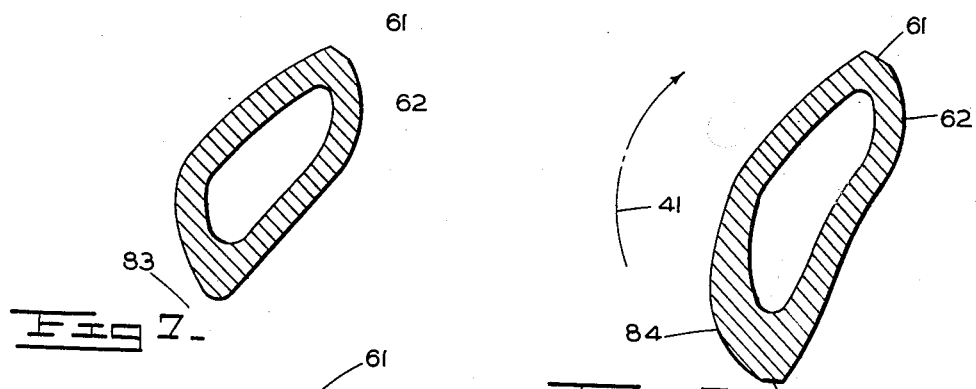
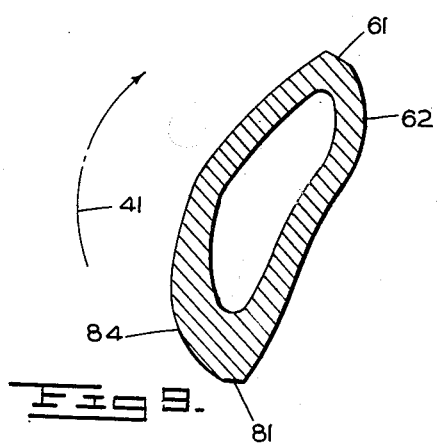
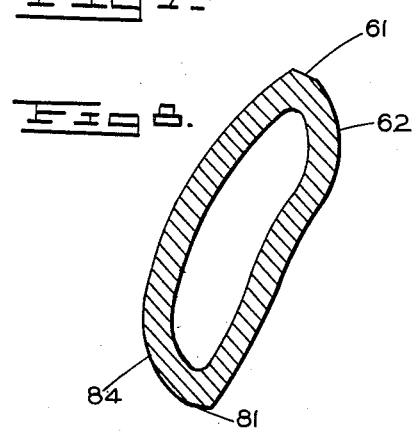

Patented July 3, 1951

2,559,418

UNITED STATES PATENT OFFICE 2,559,418

KNEADING APPARATUS

Eardley Harry Ford, East Liverpool, Ohio, assignor to The Patterson Foundry & Machine Co., East Liverpool, Ohio, a corporation of Ohio Application January 30, 1948, Serial No. 5,301

15 Claims. (Cl. 259—104)

The present invention relates to apparatus for kneading plastic materials. The invention more specifically pertains to the blades and trough structure of apparatus for masticating and dispersing gummy, tough, plastic, or elastic substances, and the invention is directed to the shape of the blades and to a combination of blades having a contour as to reduce the time and power required for kneading, dispersing and masticating plastic materials.

An object of the invention is to provide at least two intermeshing masticating and dispersing blades, each of which is mounted within an associated trough, with each blade having a plurality of dispersion sections which urge the material against its associated trough bed and saddle where the material is rolled, pressed and smeared, and the dispersion sections are of such contour as to steadily increase the intensity of the smearing and pressing action; and at the same time to convey some of the material under treatment axially of the trough, and to an escape zone portion of the blade where a part of the material under treatment is discharged into the path of a dispersion section of an associated dispersion blade for axial movement by it in the reverse direction in its associated trough, to thereby more thoroughly agitate and distribute the plastic material and at the same time reduce the power required for carrying out a kneading operation.

A still further object of the invention is to provide at least two kneading blades in a mixing chamber so shaped on the profiles thereof as to move some of the material axially during the operation of one kneading edge of one blade to position the material within the trough at such a zone as to be picked up by the dispersion edge of the other of the blades to thereby avoid the circumferential movement of the entire mass of the material under treatment and to cause some of the material to escape from the first dispersion edge into the path of movement of the dispersion edge of the other blade where the movement of the material under treatment is reversed to thereby promote thorough mixing and dispersion of a dense paste, gummy, plastic or elastic substance within the trough.

Each blade is profiled so that it has an involute surface extending from each dispersion edge surface to the hub of the blade and the blades are mounted in such close relationship to one another, that on rotation, involute surfaces of the respective blades cooperate to exert a smearing action on material therebetween and also so that a dispersing edge surface of one blade cooperates with an involute surface of the other blade to exert a smearing action on material between them.

Other objects and features of the invention will be more apparent as the present disclosure proceeds and upon consideration of the accompanying drawings and the following detailed description, wherein an exemplary embodiment of the invention is disclosed.

In the drawings:

Fig. 5 is a sectional view of one of the dispersion blades taken on the lines 5—5 of Fig. 4.

Fig. 6 is a similar sectional view taken on the lines 6—6 of Fig. 4.

Fig. 7 is a sectional view taken on the line 7—7 of Fig. 4.

Figure 4:
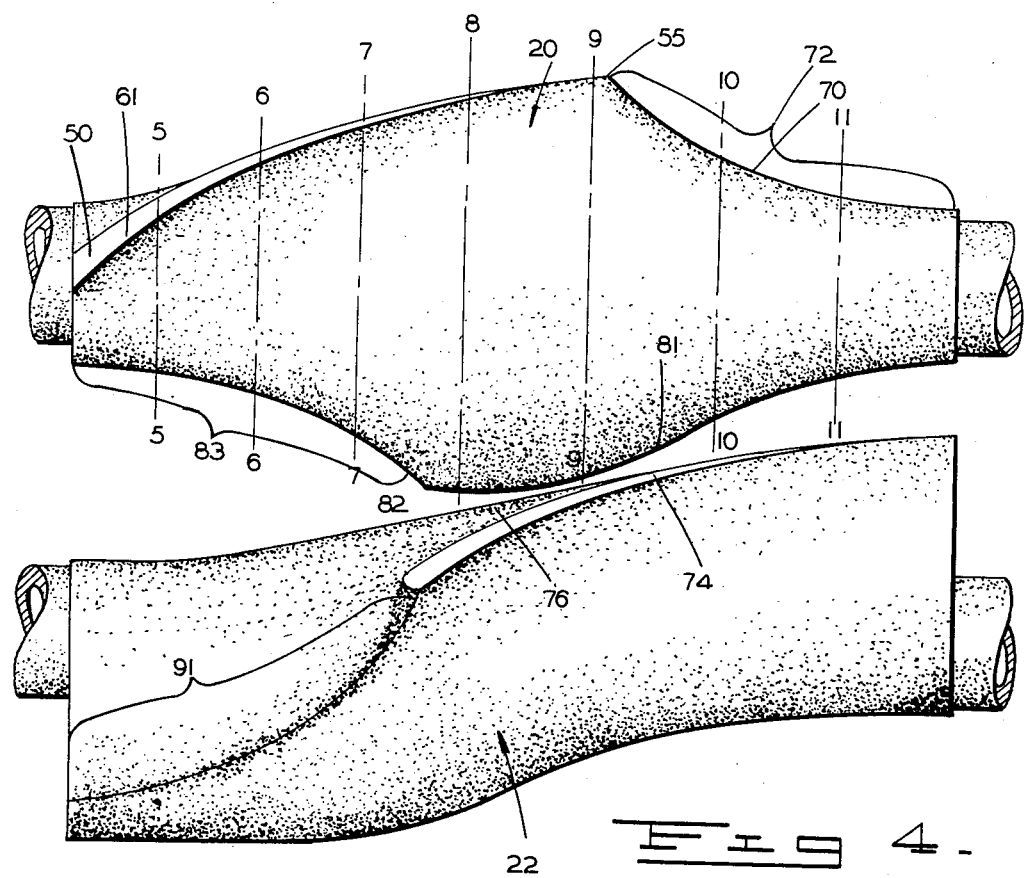
Fig. 4 is a plan view of the blades shown in Fig. 2.
Figure 12:
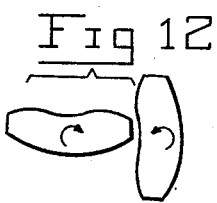
Figure 13:
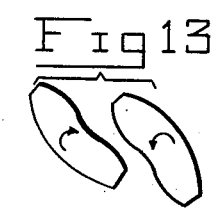
Figure 14:
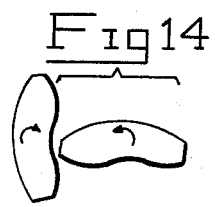
Figure 15:
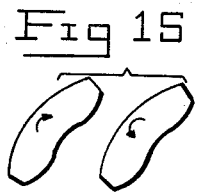
Figure 16:
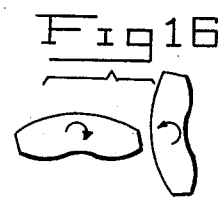

Figs. 8 and 9 are sectional views taken on the line 8—8 and line 9—9 respectively, of Fig. 4 and showing portions of the blade where the dispersion edges may overlap.

Fig. 10 is a sectional view taken on the line 10—10 of Fig. 4.

Fig. 11 is a sectional view of the blade taken on the line 11—11 of Fig. 4.

Figs. 12 to 16 inclusive are a series of diagrammatic views showing positions assumed by the respective portions of the blades at the line 8—8 of Fig. 4 during one-half of a revolution.

The invention is directed to a kneading mechanism wherein the dispersing blades cooperate with each other and a trough, so as to urge any tough, gummy substance of elastic, pasty, or plastic nature into engagement with the trough saddle so as to smear and crush the material with increasing pressure and smearing action as the material is brought nearer the saddle of the mixing chamber. The material is also moved axially and same escapes between the saddle of the trough and an escape zone formed on the periphery of the dispersing blade and is then in a position to be engaged by the dispersing edge of the associated blade. Accordingly, the blades are mounted for intermeshing or overlapping rotation within the mixing chamber and the blades are rotated in opposite directions so that the adjacent peripheral portions move downwardly whereby the material being moved axially by one blade is discharged through the escape zone of that blade into the path of the other blade where it is picked up by the dispersion section of the other blade for axial movement in the reverse direction, the folding movement being downwards and thus preventing the mass from idling or riding on top of the blades.

Figure 2:
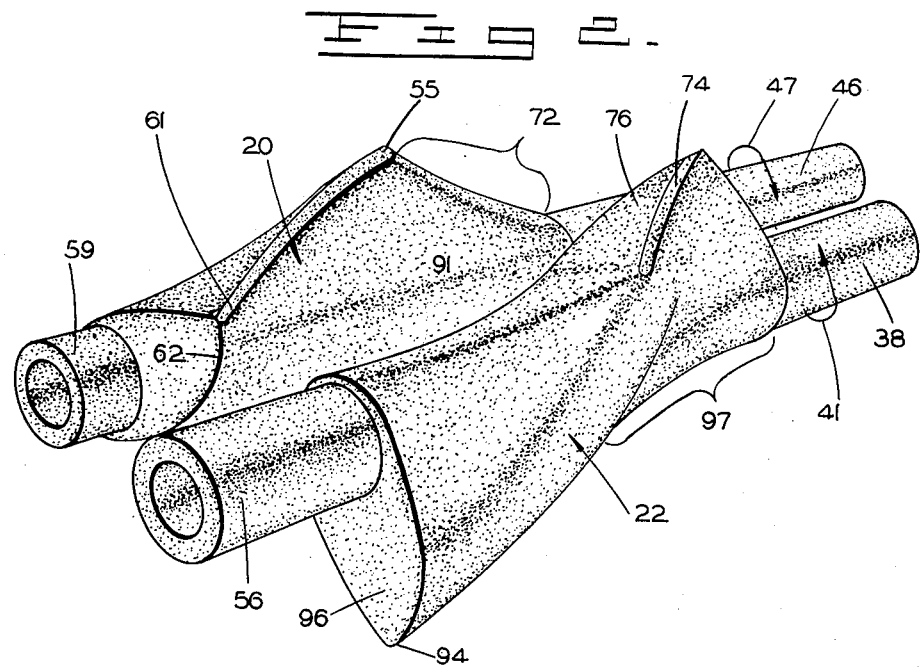
Fig. 2 is a perspective view of the dispersion blades exhibiting the invention.
Figure 3:
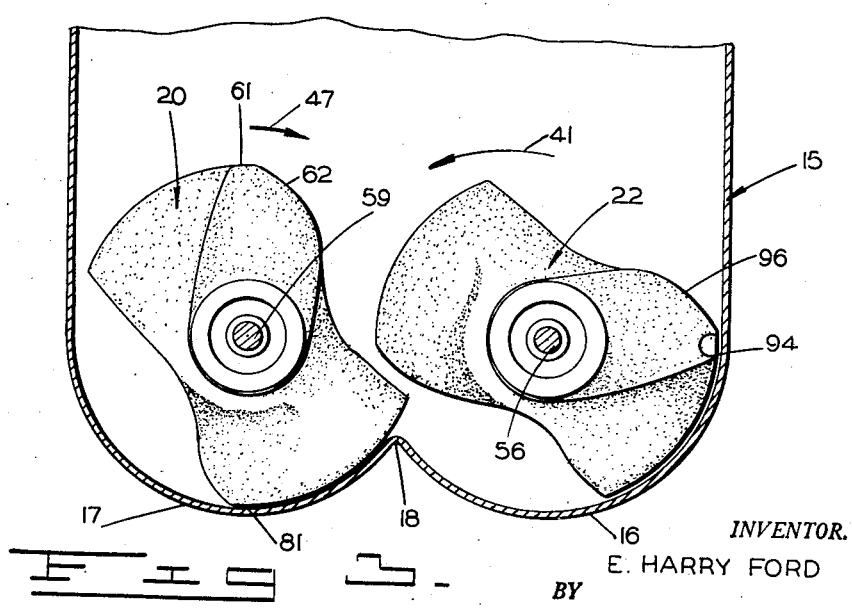
Fig. 3 is a sectional view of a trough illustrating the blades in end elevation.

Referring to the drawings, there is shown in Figs. 2 and 4 two dispersion blades exhibiting the invention. These blades are of unique shape and are adapted to be arranged in side by side relationship and mounted within a trough shown generally at 15 in Fig. 3. This trough is of sufficient length to accommodate the profile portions of the blade and includes two partially cylindrical portions 16 and 17. The arc of these partially cylindrical portions corresponds substantially to the radius of the blades and these arcuate surfaces merge to provide a ridge or saddle 18 extending lengthwise throughout the trough. The trough may be formed of any suitable material such as metal and in one embodiment (not shown) the trough may be provided with a jacket for supplying heat, or a cooling medium, to the material being kneaded in the mixing chamber.

Figure 1:
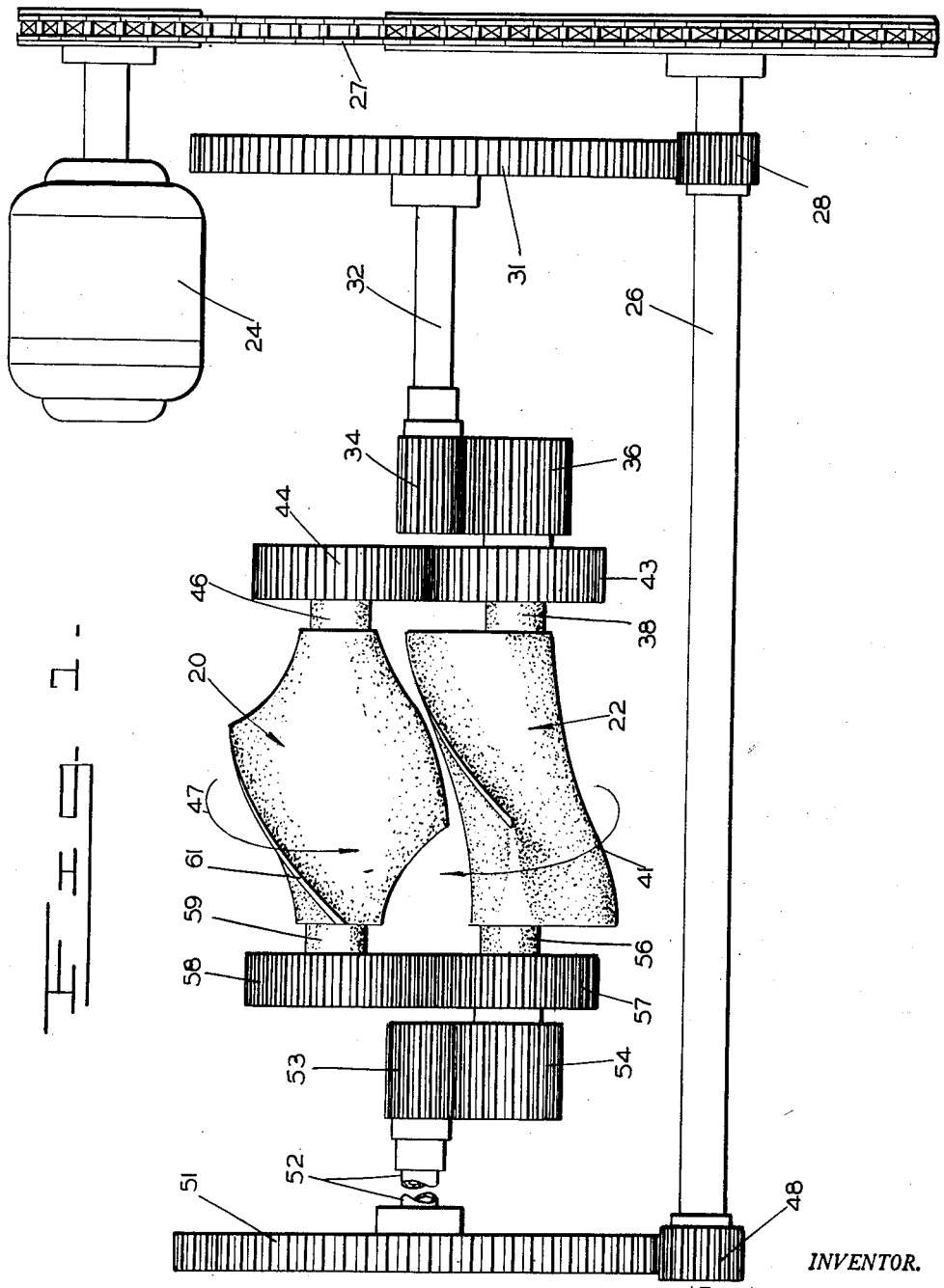
Fig. 1 is a plan view of dispersing blades embodying the invention and illustrating, in diagrammatic manner only, a driving mechanism for the blades.

The blades 20 and 22 may be rotated in the trough 18 by any suitable drive mechanism such as illustrated in Fig. 1 where the trough is omitted in order to clearly depict the driving mechanism. A prime mover such as a motor 24 is provided to drive the blades. This motor may be connected to a shaft 26 by means of a suitable transmission mechanism such as a chain 27 trained about sprocket wheels carried by ends of the motor shaft and the shaft 26. A pinion gear 28 may be mounted on the shaft 26 which meshes with a larger gear wheel 31 mounted on a rotatable shaft 32. The pinion gear 28 accordingly drives the gear wheel 31 to rotate the shaft 32. A gear 34 may be attached to the shaft 32 and meshes with a gear wheel 36 carried by the shaft portion 38 of the blade 22. The blade 22 is therefore driven in the direction of the arrow 41 whereby the peripheral portion adjacent to the blade 20 moves downwardly. A gear 43 attached to the shaft 38 meshes with a gear wheel 44 carried on shaft portion 46 of the blade 20. This gear arrangement causes the blade 20 to move in the direction of the arrow 47.

Another pinion gear 48 may be mounted on the shaft 26 and meshes with a large gear wheel 51 to drive a shaft 52. The shaft 52 carries a gear 53 which meshes with a larger gear wheel 54. The gear wheel 54 may be attached to a shaft portion 56 of the blade 22. This portion of the gear transmission mechanism also turns the blade 22 in the direction of the arrow 41. A gear wheel 57 may be attached to the shaft portion 56 and meshes with a gear wheel 58 secured to the shaft 59 of the blade 20. This gear assembly also drives the blade 20 in the direction of the arrow 47. Accordingly, when the motor 24 is started the blades 20 and 22 are driven in the direction of the arrows 41 and 47 whereby the adjacent peripheral portions move downwardly to move the material under treatment in the general direction of the saddle 18 of the trough.

A characteristic and important feature of the invention pertains to the profile of the blades 20 and 22. Each blade is provided with two dispersion edge surfaces and two escape zones; and each blade has an involute surface which follows each dispersion edge surface lengthwise of the blade and extends from the dispersion edge surface to the hub of the blade. Considering the blade 20, one of the dispersion edge surfaces is shown at 61 and extends angularly to the axis of the blade or in a helical manner over more than one-half of the length of the blade. This dispersion edge surface 61 extends from the left end of the blade, as shown in Fig. 4, to a point indicated at 55. The end 50 of this dispersion edge surface is arranged approximately ninety degrees, more or less, forward of the point 55 with respect to the direction of rotation. It is to be noted that this edge surface 61 is concentric with the axis of the blade 20 and is displaced sufficiently from the axle of the shaft 59 to provide very slight clearance with the arcuate portion 17 of the trough.

The blade profiles forwardly of the dispersion edge surfaces with respect to the direction of rotation are involute surfaces of pronounced curvature as indicated at 62 in Figs. 2, 5, 6, 7, 8 and 9. The intermeshing blades are mounted on axes sufficiently close to one another that as the blades 20 and 22 move in the direction of the arrows 41 and 47, the adjacent involute surfaces of the blades cooperate and are progressively brought into closer and closer relationship to one another, and sufficiently close to one another as to exert a smearing action of progressively increasing intensity on the material therebetween, as shown in Figs. 12 to 16. Also, as the rotation of the blades continues, the dispersion edge surfaces of each blade move to a position where they cooperate with adjacent involute surfaces of the other blade to exert a smearing action of progressively increasing intensity on the material therebetween.

The rotation of the blades in the direction indicated also causes the material to be carried downwardly and pressed into and against the troughs 16 and 17 and the saddle 18 therebetween. As the pressing operation continues, the crushing and smearing action is continued and the pressure increases to masticate the plastic material under treatment. The involute portion 62 also extends angularly of the blade and in general follows the angular disposition of the kneading edge 61. The dispersion edge surface 61 and the involute portion 62 may be regarded as one functional kneading or dispersion section of the blade 20.

The kneading edge terminates at 55 where the profile of the blade 20 is arranged at a smaller distance from the axis of the blade to provide an escape zone indicated at 72. The character of the blade profile in this area will be further evident upon consideration of Figs. 10 and 11 where the peripheral surface 70 of the blade 20 is located quite close to the axis of the blade. Thus, some of the material being kneaded by the edge portions 62 and 61 moves axially as the blade is rotated and this material escapes in the area indicated at 72 into the path of the other blade for movement by said other blade axially in the reverse direction, and is thus not moved to any great extent circumferentially with the blade 20, nor is it forced with any substantial pressure against the end walls of the troughs 16 and 17.

The material which has escaped from the dispersion section 61, 62 is then in a position to be engaged by a kneading and dispersion section carried by the blade 22, including a dispersion edge surface 74 and an involute portion 76 arranged forward thereof with respect to the direction of rotation. The dispersion edge surface 74 and the involute portion 76 are similar to the dispersion edge surface 61 and the involute surface 62 but is arranged at the other end of the blade 22. The blade 20 carries another or second kneading and dispersion section including a dispersion edge surface 81 and corresponding involute surface 84 arranged diametrically opposite the dispersion edge 61 and extending in a helical manner from the right end of the blade in Fig. 4 to a point indicated at 82. This dispersion section is concentric with the axis of the blade 20 and is of such a radius as to provide a small clearance with the portion 17 of the trough. In proceeding toward the left in Fig. 4, beyond the point 82, the blade 20 is provided with a second escape zone 83.

The escape zone at the end of each dispersion edge surface of one blade provides space to receive an end portion of a dispersion edge surface of the other blade, thereby enabling the blades, when formed as shown, to be mounted sufficiently close to one another to obtain the smearing action on the material referred to above.

The blades are of similar construction but arranged in a reverse end to end manner so that upon rotation of the blades in the direction of the arrows 41 and 47 a smearing action first is exerted on the material between the cooperating involute surfaces of the respective blades and then between the cooperating dispersion edge surfaces and the adjacent surfaces, after which the material is wiped or smeared with pressure along the arcuate portion of the trough 17 and saddle 18 and some of the material is also moved axially in the trough to escape through the zone 72. This material is not moved circumferentially to any great extent and is in a position to be engaged by the dispersion section 74, 76 of the blade 22. The material is then moved circumferentially by the dispersion section 74, 76 and some of material is conveyed axially by the blade 22 and moves into an escape zone 91 of the blade 22. The material moving through the escape zone 91 is then in a position to be picked up by the dispersion section 61, 62 during the next revolution of the blade 20.

The blade 22 carries a second dispersion edge surface 94 and a cooperating involute portion 96. This portion of the blade 22 picks up the material escaping from the blade 20 through escape zone 83. The material is then moved circumferentially by the edge 94 and 96 and some of the plastic material is conveyed axially to escape from the blade 22 at the escape zone 97 which is arranged diametrically opposite the dispersion section 74. The dispersion edge 81, 84 of the blade 20 then picks up the material escaping from operative association with the blade 22 through the escape zone 97 for movement axially in the reverse direction.

Thus, it will be appreciated that the material is first kneaded and masticated by one kneading and dispersion section of the blade and some of this material moves axially to escape from operative association with the first blade into a position to be engaged by one of the kneading and dispersion sections of the second blade. The material is then engaged by one kneading and dispersion sections of the second blade and moved circumferentially and axially so that some of the material escapes from a first escape zone of the second blade and into a position to be engaged by the first kneading and dispersion section of the first blade. In the meantime the second kneading and dispersion section of the first blade moves the material circumferentially and axially so that some of the material escapes from operative association therewith through the second escape zone of the first blade into a position to be engaged by the second kneading and dispersion section of the second blade. The material is then moved into a different circumferential and axial direction by the second blade to escape from the second zone thereof and into a position to be engaged by the second kneading and dispersion section of the first blade. It will be appreciated, therefore, that the material under treatment is not moved as an entire mass circumferentially of the trough, but is first moved in one axial and circumferential direction and then in an opposite axial and circumferential direction. Accordingly, the circumferential direction and the axial direction of the material is alternated by the rotation of the blades.

During the entire working or treatment of the material as just described, a smearing action is being exerted on the material between the cooperating involute surfaces, between the cooperating dispersion edge surfaces and the involute surfaces, and between the blades and the troughs 16 and 17 and the saddle 18 therebetween. The mastication, kneading and dispersion, are accordingly pronounced.

The blades 20 and 22 may be formed to be hollow, as shown in Figs. 5 to 11. This feature is for the purpose of introducing a steam or fluid medium into the hollow blades for heating and cooling the material under treatment and thus offering unusually large heating and cooling areas to supplement the jacketing of trough.

While the invention has been described with reference to the specific structural features of the blades, it will be appreciated that other types of blades may be employed. Also the driving mechanism for the blades may be varied to meet the requirements of specific duties. In addition, the blades may be arranged tangentially if it should be found that such an arrangement would be more beneficial than the overlapping positions in which they are disclosed. Various modifications may be made in the duty and details of the blades without departing from the spirit and scope of the invention as set forth in the appended claims.

I claim:

1. In a kneading apparatus, a trough having two partially cylindrical inner surfaces in the lower portion thereof, a kneading blade mounted for rotation in one of said partially cylindrical portions, said blade having a kneading and dispersion section extending from one end thereof angularly to the axis of the blade, the outer edge of said kneading and dispersion section being concentric with the axis of the blade and extending rearwardly with respect to the direction of rotation of the blade in proceeding inwardly from the said end of the blade, the outer concentric portion of said kneading and dispersion section terminating short of the end of the blade remote from the end from which said section extends to provide an escape opening adjacent said remote end of the blade, said blade having a second kneading and dispersion section angularly spaced from said first kneading and dispersion section and extending from the opposite end of the blade angularly to the axis of the blade, the outer concentric edge of said second kneading and dispersion section being concentric with the axis of the blade and extending rearwardly with respect to the direction of rotation of the blade in proceeding inwardly from said opposite end of the blade, said second kneading and dispersion section terminating short of the end of the blade remote from the end from which it extends to provide an escape opening adjacent that remote end of the blade, a second kneading blade shaped like said first kneading blade and mounted for rotation in the other of said partially cylindrical portions of the trough, said second blade being in reversed end-to-end relationship with respect to said first blade and intermeshing therewith, and means for rotating said blades at the same peripheral speed in opposite directions with the adjacent peripheral portions moving downwardly, the respective escape zones of one kneading and dispersion section providing spaces through which end portions of the respective kneading and dispersion sections of the other blade pass during rotation of the blades, whereby material being worked upon will first be moved axially in one direction by one blade and discharged through an escape zone thereof into the path of the other blade for movement by said other blade axially in the reverse direction.

2. Kneading apparatus as defined in claim 1 in which the respective dispersion edges extend over more than one-half the length of each blade.

3. Kneading apparatus as defined in claim 1 in which the respective dispersion edges of each blade are diametrically opposite one another.

4. In a kneading apparatus, a pair of intermeshing kneading blades mounted in reversed end-to-end relationship for rotating on substantially parallel axes, each blade having a dispersion edge surface which extends angularly to the axis of the blade and generates a cylinder on rotation, one end of each blade having an escape zone adjacent one end of the dispersion edge surface carried thereby, each of said blades having an involute surface which follows its dispersion edge surface and extends therefrom to the hub of the blade, and means for rotating said blades at the same peripheral speed in opposite directions, the blades being so mounted and in such closed relationship to one another that on such rotation the dispersion edge surface of one blade cooperates with the involute surface of the other blade to exert a smearing action on material between them.

5. Kneading apparatus as defined in claim 4 in which the respective dispersion edge surfaces extend over more than one-half the length of each blade.

6. In a kneading apparatus, a pair of intermeshing kneading blades mounted in reversed end-to-end relationship for rotation on substantially parallel axes, each blade having two dispersion edge surfaces which extend angularly to the axis of the blade and generate a cylinder on rotation, one end of each blade having an escape zone adjacent one end of one dispersion edge surface carried thereby and the other end of each blade having an escape zone adjacent the opposite end of the other dispersion edge surface carried thereby, each blade having two involute surfaces which follow the respective dispersion edge surfaces and extend therefrom to the hub of the blade, and means for rotating said blades at the same peripheral speed in opposite directions, the blades being so mounted and in such close relationship to one another that on such rotation the dispersion edge surfaces of each blade cooperate with the respective involute surfaces of the other blade to exert a smearing action on material between the respective dispersion edge surfaces and the cooperating involute surfaces.

7. Kneading apparatus as defined in claim 6 in which the respective dispersion edge surfaces terminate short of the opposite ends of each blade to provide the escape zones.

8. Kneading apparatus as defined in claim 6 in which the respective dispersion edge surfaces of each blade are diametrically opposite one another.

9. In a kneading apparatus, a pair of intermeshing kneading blades mounted in reversed end-to-end relationship for rotation on substantially parallel axes, each blade having a dispersion edge which extends angularly to the axis of the blade and generates a cylinder on rotation, one end of each blade having an escape zone adjacent one end of the dispersion edge carried thereby, each of said blades having an involute surface which follows its dispersion edge and extends therefrom to the hub of the blade, and means for rotating said blades at the same peripheral speed in opposite directions, the blades being so mounted and in such close relationship to one another that on such rotation the respective involute surfaces of the blades cooperate with one another to exert a smearing action on the material between them.

10. Kneading apparatus as defined in claim 9 in which the respective dispersion edges terminate short of the opposite ends of each blade to provide the escape zones.

11. Kneading apparatus as defined in claim 9 in which the respective dispersion edge surfaces of each blade are diametrically opposite one another.

12. In a kneading apparatus, a pair of intermeshing kneading blades mounted in reversed end-to-end relationship for rotation on substantially parallel axes, each blade having two dispersion edges which extend angularly to the axis of the blade and generate a cylinder on rotation, one end of each blade having an escape zone adjacent one end of one dispersion edge carried thereby and the other end of each blade having an escape zone adjacent the opposite end of the other dispersion edge carried thereby, each blade having two involute surfaces which follow the respective dispersion edges and extend therefrom to the hub of the blade, and means for rotating said blades at the same peripheral speed in opposite directions, the blades being so mounted and in such close relationship to one another that on such rotation the involute surfaces of one blade cooperate with the respective involute surfaces of the other blade to exert a smearing action on the material between the respective involute surfaces.

13. Kneading apparatus as defined in claim 12 in which the respective dispersion edges extend over more than one-half the length of each blade.

14. Kneading apparatus as defined in claim 12 in which on rotation of the blades the material in passing between the cooperating involute surfaces of the blades is subjected to a smearing action of progressively increasing intensity.

15. In a kneading apparatus, a trough having two partially cylindrical portions joined together and forming a saddle therebetween, a kneading blade mounted for rotation in one of said partially cylindrical portions, said blade having a kneading and dispersion section extending from one end thereof angularly to the axis of the blade.

the outer edge of said kneading and dispersion section being concentric with the axis of the blade and extending rearwardly with respect to the direction of rotation of the blade in proceeding inwardly from the said end of the blade, the outer concentric portion of said kneading and dispersion section terminating short of the end of the blade remote from the end from which said section extends to provide an escape opening adjacent said remote end of the blade, said blade having a second kneading and dispersion section angularly spaced from said first kneading and dispersion section and extending from the opposite end of the blade angularly to the axis of the blade, the outer concentric edge of said second kneading dispersion section being concentric with the axis of the blade and extending rearwardly with respect to the direction of rotation of the blade in proceeding inwardly from said opposite end of the blade, said second kneading and dispersion section terminating short of the end of the blade remote from the end from which it extends to provide an escape opening adjacent that remote end of the blade, a second kneading blade shaped like said first kneading blade and mounted for rotation in the other of said partially cylindrical portions of the trough, said second blade being in reversed end-to-end relationship with respect to said first blade and intermeshing therewith, and means for rotating said blades at the same peripheral speed in opposite directions with the adjacent peripheral portions moving downwardly, the respective escape zones of one kneading and dispersion section providing spaces through which end portions of the respective kneading and dispersion sections of the other blade pass during rotation of the blades, whereby material being worked upon will first be moved axially in one direction by one blade and discharged through an escape zone thereof into the path of the other blade for movement by said other blade axially in the reverse direction, each of said kneading and dispersion sections having an involute surface following the outer concentric edge thereof and extending therefrom to the hub of the blade, the blades being so mounted and in such close relationship to one another that during such rotation the involute surfaces of one blade cooperate with respective involute surfaces of the other blade to exert a smearing action on material between them.

EARDLEY HARRY FORD.

REFERENCES CITED

The following references are of record in the file of this patent:

UNITED STATES PATENTS

| Number | Name | Date |
|---|---|---|
| 1,200,070 | Banbury | Oct. 3, 1916 |
| 1,412,532 | Lohmann | Apr. 11, 1922 |
| 2,027,185 | Loomis | Jan. 7, 1936 |
| 2,231,911 | Hitt et al. | Feb. 18, 1941 |
| 2,299,502 | Schnuck et al. | Oct. 20, 1942 |
| 2,309,594 | Hutchings | Jan. 26, 1943 |
| 2,504,337 | Loomis | Apr. 18, 1950 |

FOREIGN PATENTS

| Number | Country | Date |
|---|---|---|
| 115,234 | Great Britain | July 29, 1920 |